(12) United States Patent
Vargas et al.

(10) Patent No.: US 6,745,048 B2
(45) Date of Patent: Jun. 1, 2004

(54) SIM MANAGER API

(75) Inventors: Garrett R. Vargas, Kirkland, WA (US); Alan W. Shen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 09/768,587

(22) Filed: Jan. 25, 2001

(65) Prior Publication Data

US 2002/0099871 A1 Jul. 25, 2002

(51) Int. Cl.$^7$ ................................................ H04Q 7/32
(52) U.S. Cl. ..................... 455/558; 455/556.1; 455/557; 455/418; 719/328; 719/330; 719/331
(58) Field of Search ................................. 455/558, 557, 455/559, 414.1–414.4, 418, 550.1, 422.1; 719/328, 330, 222; 717/176–178

(56) References Cited

U.S. PATENT DOCUMENTS 6,539,437 B1 * 3/2003 Windheim et al. ...... 719/328 X
6,650,895 B1 * 11/2003 Ravishankar et al. .... 455/422.1

FOREIGN PATENT DOCUMENTS

WO    WO 200017786 A1 * 3/2000  ........... G06F/17/30

OTHER PUBLICATIONS

IEEE Communications Magazine, *Overview of the GSM System and Protocol Architecture*, 9 pages, Apr. 1993.
European Telecommunication Standards Institute, ETS 300 585, *Digital Cellular Telecommunications System (Phase 2); Use of Data Terminal Equipment—Data Circuit Terminating Equipment (DTE–DCE) Interface for Short Message Service (SMS) and Cell Broadcast Service (CBS)* (GSM 07.05), 68 pages, Apr. 1997.
European Telecommunication Standards Institute, ETS 300 642 *Digital Cellular Telecommunications System (Phase 2); AT Command set for GMS Mobile Equipment (ME)* (GSM 07.07 version 4.4.1), 78 pages, Mar. 1999.

* cited by examiner

Primary Examiner—Nay Maung
Assistant Examiner—Philip J. Sobutka
(74) Attorney, Agent, or Firm—Banner & Witcoff, Ltd.

(57) ABSTRACT

A SIM Manager is disclosed that accesses functionality contained within a GSM-type telephone SIM by combining functionality of a plurality of asynchronous RIL functions into a single synchronous application programming interface. A first dynamic link library receives a function call for performing a selected function from an application operating in a GSM-type telephone device. The first dynamic link library is preferably a stub dynamic link library to which applications link, links to the application and initiates a process thread corresponding to the received function call, thereby blocking all subsequently received calls until the received function call for the selected function is complete. A second dynamic link library contains at least one application programming interface corresponding to the selected function. Each application programming interface corresponds to the selected function within the second dynamic link library links to a radio interface layer of the GSM-type telephone device for performing the selected function. The second dynamic link library is loaded by the first dynamic link library when the first dynamic link library receives the function call. The second dynamic link library initiates a process thread corresponding to the received function call and blocks all subsequently received calls until the received function call for the selected function is complete.

40 Claims, 2 Drawing Sheets

SIM MANAGER API

TECHNICAL FIELD

The invention generally relates to application programming interfaces (APIs). More particularly, the invention relates to an API set for accessing functionality contained within a memory device.

BACKGROUND OF THE INVENTION

Presently, functionality of a GSM-type SIM card is accessed using Radio Interface Layer (RIL) APIs, which roughly correspond to the AT commands specified by ETS 300 585, Digital cellular telecommunications system (Phase 2); Use of Data Terminal Equipment—Data Circuit terminating Equipment (DTE—DCE) interface for Short Message Service (SMS) and Cell Broadcast Service (CBS) (GSM 07.05), Fifth Edition, April 1997, and ETS 300 642, Digital cellular telecommunications system (Phase 2); AT command set for GSM Mobile Equipment (ME) (GSM 07.07 version 4.4.1), Fourth Edition, March 1999. Often, more than one RIL API function is required for accessing a particular SIM card feature so that synchronization is necessary between different RIL API calls. For example, to read an entry stored in a particular SIM phonebook using RIL APIs, an RIL function must first be called for setting the current phonebook on the SIM card. A second API is then called for reading a phonebook entry having a specified index. When another application sets the SIM phonebook to a different phonebook prior to a response to the second API, the results of the second API will be erroneous.

Consequently, what is needed is a way for information to be safely read or written to a SIM card without the possibility of another application invalidating the results.

SUMMARY OF THE INVENTION

The present invention provides a way for information to be safely read or written to a SIM card without the possibility of another application invalidating the results. Moreover, the present invention provides a set of synchronous commands that encapsulate conventional RIL APIs so that applications calling the API set of the invention are not required to have specific knowledge regarding conventional RIL APIs.

The advantages of the present invention are provided by a SIM Manager that accesses functionality contained within a GSM-type telephone SIM by combining the functionality of a plurality of asynchronous RIL functions into a single synchronous application programming interface. According to the invention, a first dynamic link library receives a function call for performing a selected function from an application operating in a GSM-type telephone device. The first dynamic link library is preferably a stub dynamic link library to which applications link. A second dynamic link library contains at least one application programming interface corresponding to the selected function. Each application programming interface corresponding to the selected function within the second dynamic link library links to a radio interface layer of the GSM-type telephone device for performing the selected function. The second dynamic link library is loaded by the first dynamic link library when the first dynamic link library receives the function call. The second dynamic link library initiate a process thread corresponding to the received function call and blocks all subsequently received calls until the received function call for the selected function is complete.

When the first dynamic link library receives a function call for performing the initialization function, the first dynamic link library sends an initialization call to the second dynamic link library for initializing the SIM card. When the second dynamic link library initializes the SIM card, the second dynamic link library obtains an HRIL handle for making subsequent calls to the RIL. According to the invention, the initialization function creates a globally named event handle for synchronizing calls from a plurality of applications operating in the GSM-type telephone device to the SIM Manager. When the first dynamic link library receives a function call for performing a selected function after the initialization function, the second dynamic link library attempts to obtain a globally named event handle that was created during an initialization process of a SIM card. When the function call for performing the selected function is complete, the second dynamic link library releases the globally named event handle. When the first dynamic link library receives a function call from the application for performing a notification function, the second dynamic link library initiates a second process thread so that the calling application does not block other applications running on the GSM-type telephone device. Notifications can be received directly from the radio interface layer or from a SIM toolkit process.

The present invention also provides a method for communicating between an application layer within a GSM-type telephone device and a radio interface layer (RIL) within the GSM-type telephone device. According to this aspect of the invention, a function call for performing a selected function is received at a first dynamic link library from an application operating in the GSM-type telephone device. The first dynamic link library is preferably a stub dynamic link library to which applications link. When the function call is received, the first dynamic link library then loads a second dynamic link library. Next, a process thread corresponding to the received function call is initiated, and all subsequently received function calls at the first dynamic link library are blocked by the second dynamic link library until the received function call for the selected function is complete. A function call is issued to a second dynamic link library corresponding to the selected function. The second dynamic link library contains at least one application programming interface corresponding to the selected function, such that each application programming interface corresponding to the selected function links to a radio interface layer of the GSM-type telephone device for performing the selected function.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention can be practiced in distributed computing environments where tasks are performed by remote processing devices that are linked through a communications network. In a distributed computing environment, program modules may be located in both local and remote memory storage devices. Preferably, though, the invention provides a set of computer-executable instructions, in the form of program modules, that preferably access functionality contained within a GSM-type telephone SIM card through an API set.

Figure 1:
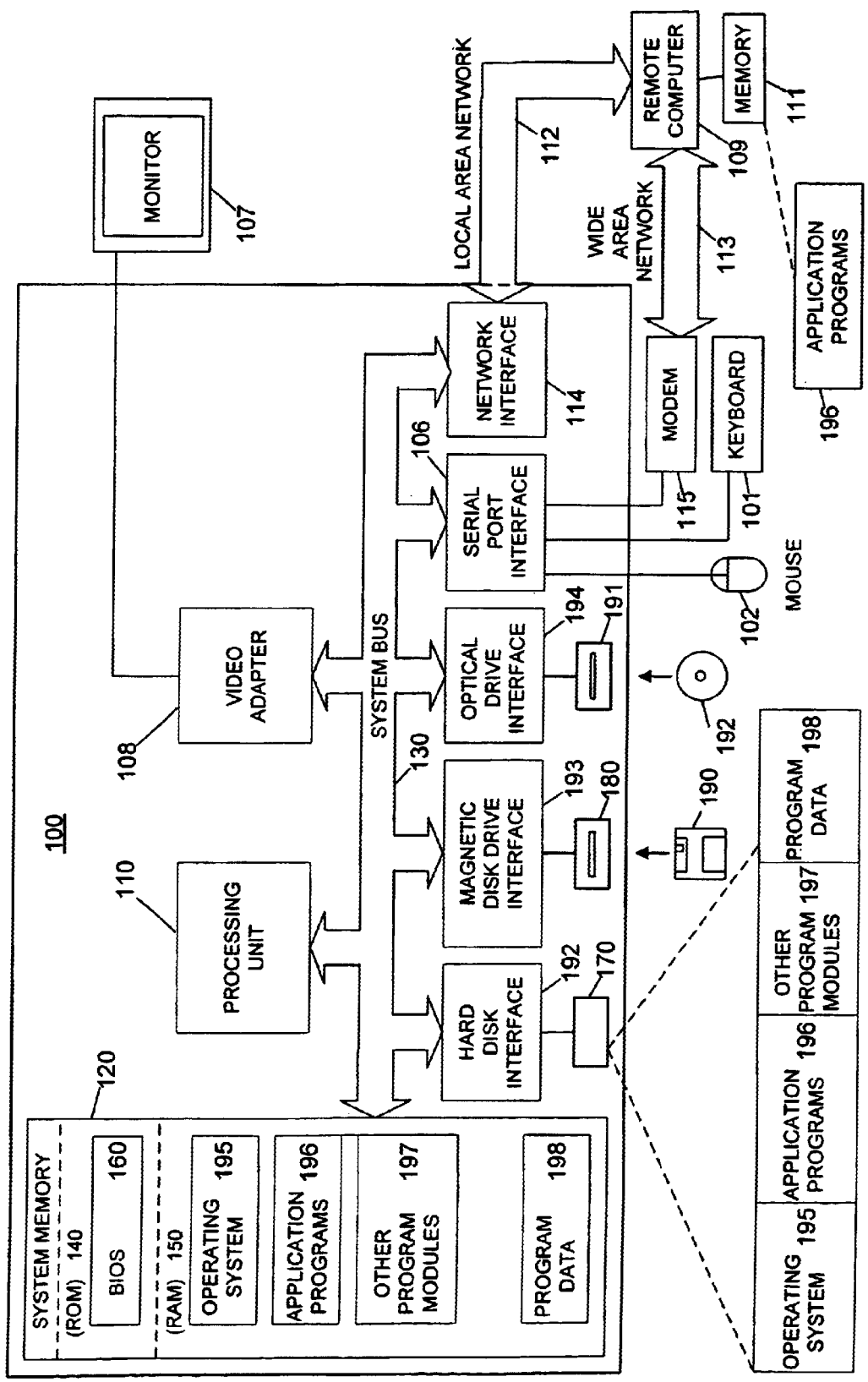
FIG. 1 is a schematic diagram of an exemplary conventional general-purpose digital computing environment that can be used to implement various aspects of the invention.

FIG. 1 is a schematic diagram of an exemplary conventional general-purpose digital computing environment that can be used to implement various aspects of the invention. Computer 100 includes a processing unit 110, a system memory 120 and a system bus 130 that couples various system components including the system memory to the processing unit 110. System bus 130 may be any of several types of bus structures including a memory bus or memory controller, a peripheral bus, and a local bus using any of a variety of bus architectures. System memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into computer 100 through input devices, such as a keyboard 101 and a pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local network 112 through a network interface or adapter 114. When used in a WAN networking environment, personal computer 100 typically includes a modem 115 or other device for establishing a communications over wide area network 113, such as the Internet. Modem 115, which may be internal or external, is connected to system bus 130 via serial port interface 106. In a networked environment, program modules depicted relative to personal computer 100, or portions thereof, may be stored in the remote memory storage device.

It will be appreciated that the network connections shown are exemplary and other techniques for establishing a communications link between the computers can be used. The existence of any of various well-known protocols, such as TCP/IP, Ethernet, FTP, HTTP and the like, is presumed, and the system can be operated in a client-server configuration to permit a user to retrieve web pages from a web-based server. Any of various conventional web browsers can be used to display and manipulate data on web pages.

A primary aspect of the invention is an API (application programming interface) set within a SIM Manager API structure that provides access to functionality contained within a GSM-type telephone SIM card, such as access to phonebook entries, passwords, file access and message storage. Additionally, the SIM Manager API structure of the present invention combines functionality of several asynchronous functions into a single synchronous API so that the SIM state is not reset beneath the SIM Manager, thereby allowing information to be safely read or written the SIM card without the possibility of another application invalidating the results. Additionally, applications calling the API set of the present invention are not required to have specific knowledge regarding conventional RIL APIs.

The present invention includes a set of two Dynamic Link Libraries (DLLs) that provide APIs for accessing SIM functionality and notifies a calling application when the state of the elements contained in the SIM card change. The first DLL is a stub DLL (simmgr.dll) that is a small DLL to which applications link. The first DLL loads a second DLL (smgreal.dll) that includes an implementation of APIs for accessing SIM functionality and for providing notifications. The two-DLL architecture provides that when a cellular phone does not have a SIM card, such as a conventional CDMA-type phone, the second DLL can be removed and the ROM size significantly reduced without adversely impacting applications using the SIM Manager.

The API set of the present invention can be divided into the following five classes of APIs:

1) Phone book APIs for reading and writing phonebook entries on the SIM;
2) Locking APIs for locking and unlocking the phone, and changing the SIM password;
3) Message APIs for reading and writing text SMS messages on the SIM card;
4) Record APIs for reading and writing records (or files) on the SIM card; and
5) Miscellaneous APIs for Initializing SIM Manager and determining the capabilities of the SIM card.

A calling application can also request to be notified whenever the status of the SIM card changes roughly corresponding to the five classes of APIs. For example, notifications can be sent to an application whenever a SIM phonebook entry is changed, whenever an SMS message has changed, etc.

Figure 2:
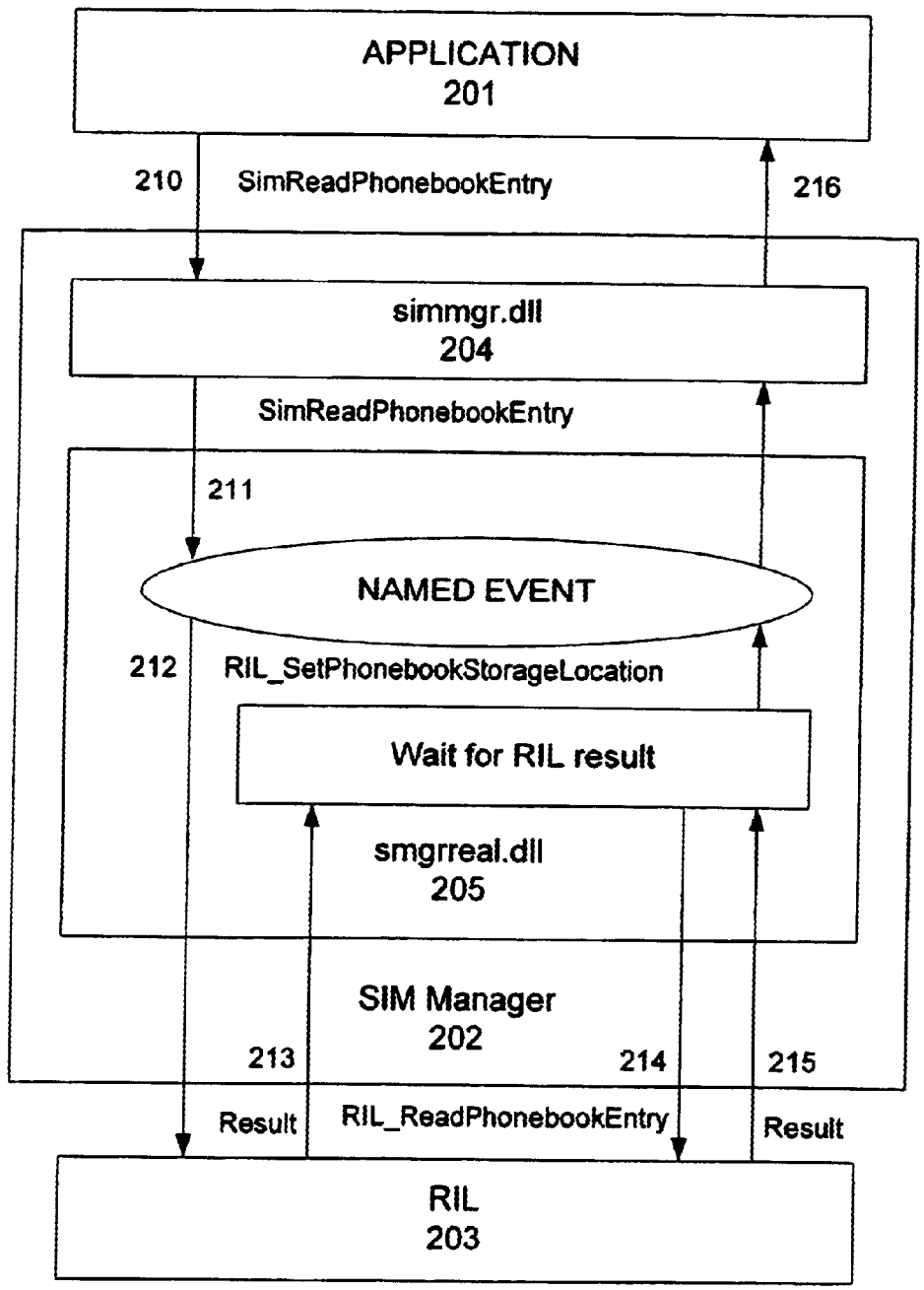
FIG. 2 shows an exemplary signal flow diagram between selected layers of a GSM-type telephone device having a SIM card for reading a phonebook entry according to the present invention.

To illustrate the present invention, FIG. 2 shows an exemplary signal flow diagram 200 between selected layers of a GSM-type telephone device having a SIM card for reading a phonebook entry according to the present invention. FIG. 2 shows the structural relationship between an application layer 201, the SIM Manager API 202 of the present invention, and a Radio Interface Layer (RIL) 203. SIM Manager 202 includes the stub DLL (simmgr.dll) 204 and second DLL (smgrreal.dll) 205. Before application 201 can access the SIM Manager APIs of the present invention, application 201 must call SimInitialize, as follows:

HRESULT SimInitialize(DWORD dwFlags, SIMCALLBACK lpfnCallBack, DWORD dwParam, LPHSIM lphSim)

SimInitialize provides a callback function flag (lpfnCallBack) that is used for indicating that notification is desired when the SIM state changes. A dwParam parameter can also be specified that is passed to the callback function. When notifications are not desired, dwFlags should be set to 0, and the second and third parameters of SimInitialize are ignored. lphSim is an out parameter that gets set with a handle to an HSIM when SIM Manager 202 is successfully initialized.

When application 201 calls the SimInitialize API, the first DLL (simmgr.dll) 204 attempts to load the second DLL (smgrreal.dll) 205. In the situation when simmgr.dll 204 is unable to load smgrreal.dll 205, simmger.dll 204 immediately returns an error code SIM_E_NOSIM to application 201. When simmgr.dll 204 is able to load smgrreal.dll 205, simmgr.dll 204 calls into smgrreal.dll 205 to perform the actual initialization operation. Second DLL simgrreal.dll 205 initializes RIL 203 and obtains an HRIL handle for making subsequent RIL calls. The initialization function also creates a globally named event handle that is used for synchronizing SIM Manager calls, as described below.

In the situation when an application desires to receive callback notifications, a second thread is set up that is able to dispatch the notifications to the calling application. A second thread is necessary so that the calling application does not block other processes while waiting in a callback function. Most notifications are received directly from RIL 203, but the present invention also provides a file refresh notification that is received from a SIM toolkit process when the SIM supports SIM toolkit applications (not shown). When the SIM supports SIM toolkit applications, the present invention registers with the SIM Toolkit process so that file refresh notifications will be received.

After SimInitialize has been successfully called, the SimReadPhonebookEntry API is called for reading a phonebook entry, as shown at 210 in FIG. 2. The SimReadPhoneBookEntry API is defined as follows:

HRESULT SimReadPhonebookEntry (HSIM hSim, DWORD dwlocation, DWORD dwIndex, LPSIMPHONEBOOKENTRY lpPhonebookEntry)

The SimReadPhonebookEntry includes a HSIM parameter that is used for passing the HSIM received from the SimInitialize call. The dwlocation parameter is used for passing a location corresponding to the SIM phonebook location that is to be accessed. The dwIndex parameter is used for passing an index pointing to an index within the phonebook location. The lpPhonebookEntry is an out parameter that is filled in with the phonebook entry.

The SimReadPhonebookEntry API first attempts at 211 to obtain a globally named event handle that was created during the SimInitialize function, thereby ensuring that no two processes on the system (i.e., another application) will be able to call into a SIM Manager API at the same time. In the event that two processes are calling APIs at the same time, one of the calling processes will block until the other process has completed and released the event for the other process to continue.

When a global named event handle has been obtained, the current phonebook storage location is determined. The SIM Manager of the present invention is able to monitor of the current phonebook storage location because the SIM Manager receives notifications from RIL whenever the storage location has changed by any process on the system. When SIM Manager 202 has not yet received this particular notification (because the location has not been changed), or the location is different than the one that the calling application has requested, SIM Manager 202 calls the RIL function RIL_SetPhonebookStorageLocation, as shown at 212. Because this particular RIL function is an asynchronous API, SIM Manager 202 waits on a second event at 213 so that the process is blocked until RIL 203 has returned a result. Preferably, the present invention stores the current phonebook storage location and checks the current phonebook storage location before first calling this asynchronous RIL API is purely for performance reliability reasons. The present invention can, alternatively, blindly call the RIL_SetPhonebookStorageLocation RIL API without a check.

After SIM Manager 202 has received confirmation from RIL 203 that the phonebook storage location has changed to the desired phonebook, the RIL_ReadPhonebookEntry API is called at 214. An important aspect about the RIL_ReadPhonebookEntry API is that only an index is needed, not a storage location, because this API reads from the currently selected storage location. Because SIM Manager 202 has just set the storage location (or verified the storage location is set to the desired storage location), and because all processes must access the SIM via the SIM Manager APIs, thereby blocking any other processes calling SIM Manager 202 until the current API is complete, the present invention is able to guarantee that the correction storage location is being read.

Once SIM Manager 202 has received the result at 215, the handle is released so other processes calling SIM Manager 202 can continue, and the result is returned to the calling application at 216. The internal RIL handle is deinitialized and any memory used by SIM Manager 202 is freed by calling the SimDeinitialize API, as follows:

HRESULT SimDeinitialize (HSIM hSim)

Generally speaking, the other APIs of the present invention follow the same logical flow as in this example. That is, the other APIs of the present invention first obtain a global event handle, call an RIL API or multiple RIL APIs, then return.

While the present invention has been described in connection with the illustrated embodiments, it will be appreciated and understood that modifications may be made without departing from the true spirit and scope of the invention.

What is claimed is:

1. A computer readable medium having a SIM Manager for accessing functionality contained within a GSM telephone SIM, the SIM Manager comprising:
   a first dynamic link library receiving a function call for performing a selected function from an application operating in a GSM telephone device; and
   a second dynamic link library containing at least one application programming interface corresponding to the selected function, each application programming interface corresponding to the selected function linking to a radio interface layer of the GSM telephone device for performing the selected function, the second dynamic link library being loaded by the first dynamic link library when the first dynamic link library receives the function call, the second dynamic link library initiating a process thread corresponding to the received function call and blocking all subsequently received calls until the received function call for the selected function is complete.

2. The SIM Manager according to claim 1, wherein the first dynamic link library is a stub dynamic link library.

3. The SIM Manager according to claim 1, wherein the SIM contains a phonebook having at least one entry, and
   wherein the SIM Manager sends a notification to at least one selected application when an entry in the SIM phonebook changes.

4. The SIM Manager according to claim 1, wherein the SIM Manager sends a notification to at least one selected application when a message contained in the GSM telephone SIM changes.

5. The SIM Manager according to claim 1, wherein the SIM Manager sends a notification to at least one selected application when a message is received by the GSM telephone SIM.

6. The SIM Manager according to claim 1, wherein when the first dynamic link library receives a function call from the application for performing a notification function, the second dynamic link library initiates a second process thread so that the calling application does not block other applications running on the GSM telephone device.

7. The SIM Manager according to claim 6, wherein the SIM Manager receives a notification directly from the radio interface layer.

8. The SIM Manager according to claim 6, wherein the SIM Manager receives a notification from a SIM toolkit process.

9. The SIM Manager according to claim 1, wherein the received function call is for performing an initialization of a SIM card, and
   wherein when the first dynamic link library receives the function call for performing the initialization function, the first dynamic link library sends an initialization call to the second dynamic link library for initializing the SIM card.

10. The SIM Manager according to claim 9, wherein when the second dynamic link library initializes the SIM card, the second dynamic link library obtains an HRIL handle for making subsequent calls to the RIL.

11. The SIM Manager according to claim 10, wherein the initialization function creates a globally-named event handle for synchronizing calls from a plurality of applications operating in the GSM telephone device to the SIM Manager.

12. The SIM Manager according to claim 1, wherein when the first dynamic link library receives the function call for performing the selected function, the second dynamic link library attempts to obtain a globally named event handle that was created during an initialization process of a SIM card.

13. The SIM Manager according to claim 12, wherein when the function call for performing the selected function is complete, the second dynamic link library releases the globally-named event handle.

14. A method for communicating between an application layer within a GSM telephone device and a radio interface layer (RIL) within the GSM telephone device, the method comprising steps of:
   receiving a function call for performing a selected function at a first dynamic link library from an application operating in the GSM telephone device;
   loading a second dynamic link library when the function call is received;
   initiating a process thread corresponding to the received function call;
   blocking all subsequently received function calls at the second dynamic link library until the received function call for the selected function is complete; and
   issuing a function call to a second dynamic link library corresponding to the selected function, the second dynamic link library containing at least one application programming interface corresponding to the selected function, each application programming interface corresponding to the selected function linking to a radio interface layer of the GSM telephone device for performing the selected function.

15. The method according to claim 14, wherein the first dynamic link library is a stub dynamic link library.

16. The method according to claim 14, wherein the RIL includes a SIM containing a phonebook having at least one entry, and
   the method further comprising a step of sending a notification to at least one selected application when an entry in the SIM phonebook changes.

17. The method according to claim 14, further comprising a step of sending a notification to at least one selected application when a message contained in the GSM telephone SIM changes.

18. The method according to claim 14, further comprising a step of sending a notification to at least one selected application when a message is received by the GSM telephone SIM.

19. The method according to claim 14, further comprising a step of initiating a second process thread by the second dynamic link library so that the calling application does not block other applications running on the GSM telephone device when the first dynamic link library receives a function call from the application for performing a notification function.

20. The method according to claim 19, further comprising a step of receiving a notification directly from the radio interface layer.

21. The method according to claim 19, further comprising a step of receiving a notification from a SIM toolkit process.

22. The method according to claim 14, wherein the received function call is for performing an initialization of a SIM card,
   the method further comprising a step of sending an initialization call to the second dynamic link library for initializing the SIM card when the first dynamic link library receives the function call for performing the initialization function.

23. The method according to claim 22, further comprising a step of obtaining an HRIL handle for making subsequent calls to the RIL when the second dynamic link library initializes the SIM card.

24. The method according to claim 23, wherein the initialization function creates a globally-named event handle for synchronizing function calls from a plurality of applications operating in the GSM telephone device.

25. The method according to claim 14, further comprising a step of attempting to obtain a globally-named event handle that was created during an initialization process of a SIM card when the first dynamic link library receives the function call for performing the selected function.

26. The method according to claim 25, further comprising a step of releasing the globally-named event handle the received function call for performing the selected function is complete.

27. A computer-readable medium having computer-executable instructions for performing steps comprising:

receiving a function call for performing a selected function at a first dynamic link library from an application operating in the GSM telephone device;

loading a second dynamic link library when the function call is received;

initiating a process thread corresponding to the received function call;

blocking all subsequently received function calls at the second dynamic link library until the received function call for the selected function is complete; and issuing a function call to a second dynamic link library corresponding to the selected function, the second dynamic link library containing at least one application programming interface corresponding to the selected function, each application programming interface corresponding to the selected function linking to a radio interface layer of the GSM telephone device for performing the selected function.

28. The computer-readable medium according to claim 27, wherein the first dynamic link library is a stub dynamic link library.

29. The computer-readable medium according to claim 27, wherein the RIL includes a SIM containing a phonebook having at least one entry, and the computer-executable instructions further comprising a step of sending a notification to at least one selected application when an entry in the SIM phonebook changes.

30. The computer-readable medium according to claim 27, wherein the SIM Manager sends a notification to at least one selected application when a message contained in the GSM telephone SIM changes.

31. The computer-readable medium according to claim 27, wherein the SIM Manager sends a notification to at least one selected application when a message is received by the GSM telephone SIM.

32. The computer-readable medium according to claim 27, further comprising a step of initiating a second process thread by the second dynamic link library so that the calling application does not block other applications running on the GSM telephone device when the first dynamic link library receives a function call from the application for performing a notification function.

33. The computer-readable medium according to claim 32, further comprising a step of receiving a notification directly from the radio interface layer.

34. The computer-readable medium according to claim 32, further comprising a step of receiving a notification from a SIM toolkit process.

35. The computer-readable medium according to claim 27, wherein the received function call is for performing an initialization of a SIM card, the method further comprising a step of sending an initialization call to the second dynamic link library for initializing the SIM card when the first dynamic link library receives the function call for performing the initialization function.

36. The computer-readable medium according to claim 35, further comprising a step of obtaining an HRIL handle for making subsequent calls to the RIL when the second dynamic link library initializes the SIM card.

37. The computer-readable medium according to claim 36, wherein the initialization function creates a globally-named event handle for synchronizing function calls from a plurality of applications operating in the GSM telephone device.

38. The computer-readable medium according to claim 27, further comprising a step of attempting to obtain a globally-named event handle that was created during an initialization process of a SIM card when the first dynamic link library receives the function call for performing the selected function.

39. The computer-readable medium according to claim 38, further comprising a step of releasing the globally-named event handle the received function call for performing the selected function is complete.

40. A SIM manager for accessing functionality contained within a GSM telephone SIM, the SIM manager comprising:

a first memory;

a first dynamic link library stored in the first memory receiving a function call for performing a selected function from an application operating in a GSM telephone device; and a second memory;

a second dynamic link library stored in the second memory containing at least one application programming interface corresponding to the selected function, each application programming interface corresponding to the selected function linking to a radio interface layer of the GSM telephone device for performing the selected function, the second dynamic link library being loaded by the first dynamic link library when the first dynamic link library receives the function call, the second dynamic link library initiating a process thread corresponding to the received function call and blocking all subsequently received calls until the received function call for the selected function is complete.

* * * * *